June 25, 1957  S. B. HENRICI ET AL  2,797,049
PRODUCTION COUNTER
Filed Nov. 26, 1952  2 Sheets-Sheet 2

Inventors:
STANLEY B. HENRICI and
WILLIAM L. ZEMBERRY,
by: Donald G. Dalton
their Attorney.

United States Patent Office 2,797,049
Patented June 25, 1957

2,797,049

PRODUCTION COUNTER

Stanley B. Henrici and William L. Zemberry, Pittsburgh, Pa., assignors to United States Steel Corporation, a corporation of New Jersey Application November 26, 1952, Serial No. 322,678

12 Claims. (Cl. 235—92)

This invention relates to production counters for pipe cutoff machines, and in its broader aspects to improved circuits for operating counters on any appropriate production equipment.

Our operating circuits are capable of general application to counters on production machines to furnish an accurate count of the number of times the machine operates apart from its total output, and the two do not always correspond. For example, a cutoff machine, which is used in the manufacture of pipe for cropping defective end portions, may be required to make several cuts in one pipe before a place is found where the wall is acceptable throughout its circumference. A separate count may be needed of the total number of cuts, apart from total output of cropped pipes, as when the operator's pay is based on the number of cuts.

An object of the present invention is to provide an improved counter circuit adapted to register accurately the number of complete operations of a production machine, but not incomplete or false operations, apart from the total output, which may be different.

A further object is to provide improved counter circuits in which the accuracy of the count is not disturbed by auxiliary operations of the machine, such as a bevelling operation performed by a pipe cutoff machine.

A further object is to provide, in combination with a pipe cutoff machine, an improved production counter and operating circuit which accurately registers the number of complete cuts the machine makes and the total output, but does not register incomplete or false cuts nor bevelling operations.

Figure 1:
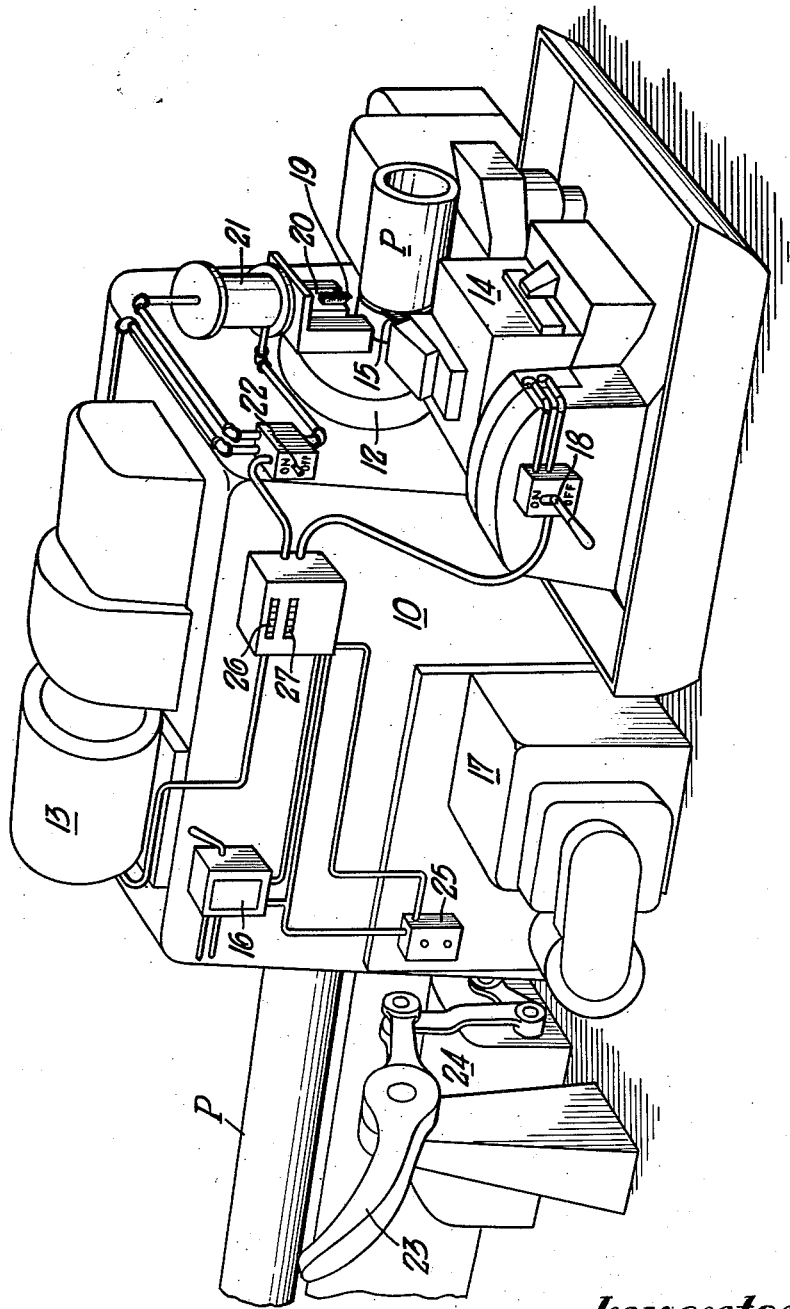
Figure 2:
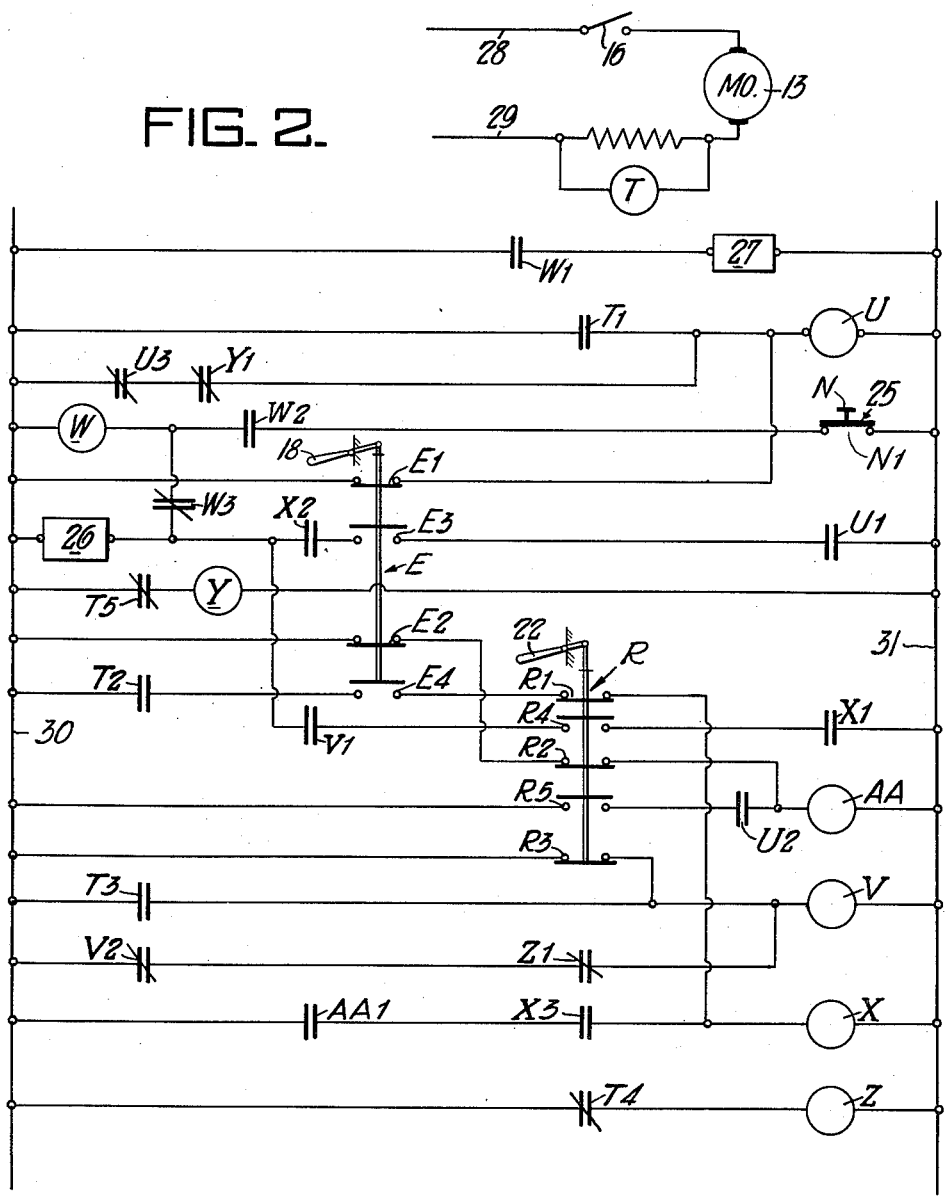

In accomplishing these and other objects of the invention, we have provided improved details of structure, a preferred form of which is shown in the accompanying drawings, in which:

Figure 1 is an isometric view of a pipe cutoff machine equipped with an improved production counter embodying features of the present invention; and Figure 2 is a schematic wiring diagram of the circuits for operating the counter.

Figure 1 shows somewhat diagrammatically a typical pipe cutoff machine which is one example of a machine to which the circuits of the present invention can be applied. The machine comprises a housing 10, a pipe gripping chuck 12 rotatably mounted in said housing, a main drive motor 13 for rotating said chuck, a reciprocable tool feed carriage 14, a cutting tool 15 mounted on said carriage, and an operating switch 16 which controls the motor 13. The switch 16 is closed to start the motor which thus rotates the chuck. A pipe P is fed into the housing 10 from the left and gripped by the rotating chuck 12 just behind the plane at which it is to be cropped. The tool feed carriage 14 is operated by a hydraulic cylinder, not shown. A motor 17 produces hydraulic pressure for operating said cylinder. A handle 18 controls the hydraulic circuit and thus controls movement of the carriage 14. With the pipe gripped and rotating, the handle 18 is moved from its "off" to its "on" position to advance the tool feed carriage and cut the pipe. On completion of the cut this handle is returned to its "off" position and the carriage automatically retracts. The pipe wall at the end is checked; if defective, the pipe is advanced and another cut made in the same manner. This process is continued as many times as necessary until a place is found where the pipe wall is acceptable throughout the circumference.

The machine also is equipped with a bevelling tool 19 which can be used to bevel the cut end of the pipe where a bevelled end is desired. The tool 19 is mounted on a reciprocably carriage 20 which is operated by a pneumatic cylinder 21. A handle 22 contols the pneumatic circuit which operates carriage 20. Normally the bevelling operation is performed after the cutting operation has been completed and the tool feed carriage 14 retracted. Nevertheless this sequence can be varied (a) by starting the bevelling operation shortly after starting the cutting operation and completing the bevelling ahead of the cutting, (b) by starting the bevelling operation shortly after starting the cutting operation but completing cutting ahead of the bevelling, or (c) bevelling after the cutting operation is completed but before the tool feed carriage 14 is retracted. In any case, the bevelling is performed by moving the handle 22 from its "off" to its "on" position so that the carriage 20 and tool 19 advance toward the pipe. When bevelling is completed, the handle 22 is returned to its "off" position.

The machine has a kick out arm 23 which is operated by a motor 24 controlled by a switch 25. After the pipe has been cut and a place found where the wall adjacent the end is acceptable and the end bevelled if desired, the chuck 12, although still rotating, is released and the pipe retracted toward the left. After the pipe is removed from the machine, closing of switch 25 operates the kick out means.

The parts thus far described are of standard construction and operation, and per se not part of the present invention; therefore they are not shown nor described in detail. Complete showings of machines of this sort can be found in Hornberger Patent No. 1,772,148 and Libby Patent No. 1,972,595. However, these machines are merely typical of the sort to which the circuits of the present invention are applicable, and do not limit the invention.

In accordance with the present invention, the machine is equipped with a counter 26 which registers the number of complete cuts the machine makes and a second counter 27 which registers the number of pipes kicked out by the arm 23. The two numbers do not necessarily correspond because the machine often is required to make several cuts for one pipe before acceptable wall is found throughout the circumference. The counters per se can be of any standard or desirable construction adapted to be cocked when an electric current passes therethrough and to register a count when this current is broken, and consequently are not shown in detail.

*Electric circuit (general)*

Figure 2 shows the operating circuit for the counters. The circuit includes an overload relay T and seven additional relays U, V, W, X, Y, Z and AA. Relays Y and Z are of the slow-closing type. In the starting position (i. e. when handle 18, which also controls multiple contact switch E, and handle 22, which also controls multiple contact switch R, are both in their "off" positions) relays U, V, Y, Z and AA are energized via current paths hereinafter described. When we describe the contacts of these normally energized relays as "normally open" and as "normally closed," we mean they are in these positions when the relays are in their normally energized condition. Thus in the five normally energized relays, the contacts described as normally open actually are back contacts and those described as normally closed actually are front contacts, just the reverse of the contacts of the normally deenergized relays T, W and X. The symbols in Figure 2 follow the same scheme.

Rleay T (normally deenergized) has three sets of normally open (front) contacts $T_1$, $T_2$ and $T_3$ and two sets of normally closed (back) contacts $T_4$ and $T_5$. Relay U (normally energized) has two sets of normally open (back) contacts $U_1$ and $U_2$ and one set of normally closed (front) contacts $U_3$. Relay V (normally energized) has one set of normally open (back) contacts $V_1$ and one set of normally closed (front) contacts $V_2$. Relay W (normally deenergized) has two sets of normally open (front) contacts $W_1$ and $W_2$, and one set of normally closed (back) contacts $W_3$. Relay X (normally deenergized) has three sets of normally open (front) contacts $X_1$, $X_2$ and $X_3$. Relay Y (normally energized) has one set of normally closed (front) contacts $Y_1$. Relay Z (normally energized) has one set of normally closed (front) contacts $Z_1$. Relay AA (normally energized) has one set of normally open (back) contacts $AA_1$.

Switch E (operated by the handle 18) has two sets of normally closed contacts $E_1$ and $E_2$ and two sets of normally open contacts $E_3$ and $E_4$. Switch R (operated by the handle 22) has three sets of normally closed contacts $R_1$, $R_2$ and $R_3$ and two sets of normally open contacts $R_4$ and $R_5$. The kick-out switch 25 operates a contactor N, which has one set of normally closed contacts $N_1$. The main drive motor 13 and the relay T are energized from lines 28 and 29. The two counters 26 and 27 and the other relays are energized from lines 30 and 31.

The coil of relay T is in the circuit of the main drive motor 13. When this motor is energized and idly rotating the chuck 12 and pipe P, it draws a relatively small current from its lines 28 and 29. When either the cutting tool 15 or bevelling tool 19 or both are advancing into the pipe, the motor draws additional current. The relay T is adjusted to pick up when the additional current passes through it to the motor, but not when the smaller idling current passes therethrough. Thus for this relay to pick up three conditions are necessary, namely, (a) switch 16 must be closed and energizing motor 13, (b) either or both handles 18 and 22 must be in the "on" position and advancing carriage 14 or 20, and (c) a pipe P must be present in the machine and receiving a cut or a bevel. As appears hereinafter, operation of either counter requires energization of relay T. Therefore this arrangement insures against registering a count merely by closing the switches and making a false cut without a pipe in the machine.

*Circuit for counting the number of cuts*

The coil of the normally energized relay U is connected across the lines 30 and 31 via three possible alternative current paths, namely (a) via the normally closed contacts $E_1$, and (b) via the normally closed contacts $U_3$ and $Y_1$, and (c) via the normally open contacts $T_1$. The coil of the normally deenergized relay X is connected across these lines via two possible alternative current paths, namely, (a) via the normally open contacts $T_2$ and $E_4$ and the normally closed contacts $R_1$, and (b) via the normally open contacts $AA_1$ and $X_3$. The coil of the normally energized relay Y is connected across these lines via the normally closed contacts $T_5$. The coil of the normally energized relay AA is connected across these lines via two possible alternative paths, namely (a) via the normally closed contacts $E_2$ and $R_2$, and (b) via the normally open contacts $U_2$ and $R_5$. The counter 26 is connected across these lines via two possible alternative paths, namely, (a) via the normally open contacts $X_2$, $E_3$ and $U_1$, and (b) via the normally open contacts $V_1$, $R_4$ and $X_1$. The second current paths through both the relay AA and the counter 26 function in the bevelling part of the circuit and are described later.

At the start of an actual cut, the operator throws handle 18 to the "on" position whereupon switch E assumes its "on" position. The normally closed contacts $E_1$ and $E_2$ open and the normally open contacts $E_3$ and $E_4$ close. Opening of contacts $E_1$ does not deenergize relay U, since its hold circuit via contacts $U_3$ and $Y_1$ remains closed. Opening of contacts $E_2$ deenergizes relay AA and closes its normally open contacts $AA_1$. As cutting gets underway, relay T picks up and its normally open contacts $T_1$, $T_2$ and $T_3$ close and its normally closed contacts $T_4$ and $T_5$ open. The contacts $T_3$ and $T_4$ are in the bevelling portion of the circuit and their action is described later. Closing of contacts $T_1$ completes the third current path through the coil of relay U to maintain this relay energized. Opening of contacts $T_5$ breaks the current path through the coil of relay Y, whereupon this relay drops out and its normally closed contacts $Y_1$ open. Thus relay U now is energized only via contacts $T_1$. Closing of contacts $T_2$ and $E_4$ energizes relay X, whereupon its normally open contacts $X_1$, $X_2$ and $X_3$ close. Closing of contacts $X_3$ seals in the relay, since contacts $AA_1$ already are closed. Closing of contacts $X_2$ sets up the first current path through counter 26, since contacts $E_3$ already are closed. Contacts $X_1$ are in the bevelling portion of the circuit and their action is described later.

As soon as a cut is completed, motor 13 again draws only its idling current and relay T drops out, whereupon its contacts return to their normal positions. Opening of contacts $T_1$ breaks the only remaining current path through the coil of relay U, whereupon this relay drops out. Opening of contacts $T_2$ breaks one current path through the coil of relay X, but the relay remains energized via its hold circuit, contacts $AA_1$ and $X_3$. Closing of contacts $T_5$ reestablishes the current path through the coil of relay Y, but this relay is slow closing and for the moment its contacts $Y_1$ remain open. As relay U drops out, its normally open contacts $U_1$ and $U_2$ close and its normally closed contacts $U_3$ open. Closing of contacts $U_1$ completes the circuit through counter 26 and cocks this counter. Thus the counter is cocked only when the cut actually is completed. Opening of contacts $U_3$ breaks the hold circuit through the coil of relay U, and thereafter contacts $Y_1$ close to enable this circuit to reset. Contacts $U_2$ are in the bevelling portion of the circuit and their action is described later.

Next the operator throws handles 18 to the "off" position to retract the tool feed carriage 14 and thereby returns the multiple contact switch E to its normal position, whereupon the contacts $E_1$, $E_2$, $E_3$ and $E_4$ return to their normal positions. Opening of contacts $E_3$ breaks the circuit through counter 26, whereupon a count registers. Closing of contacts $E_2$ energizes relay AA, whereupon its normally open contacts $AA_1$ return to their normal position and break the hold circuit of relay X. Closing of contacts $E_1$ reestablishes the first current path through relay U, which now picks up and seals in by closing of its contacts $U_3$. Thus the circuit for counter 26 is fully reset and, if another cut is made on the same pipe, the action just described is repeated.

*Circuit for counting total output*

The coil of the normally deenergized relay W is connected across the lines 30 and 31 via three possible alternative current paths, namely (a) via the normally closed contacts $W_3$ and the normally open contacts $X_2$, $E_3$ and $U_1$, (b) via the normally open contacts $W_2$ and the normally closed contacts $N_1$, and (c) via the normally closed contacts $W_3$ and the normally open contacts $V_1$, $R_4$ and $X_1$. Counter 27 is connected across these lines via the normally open contacts $W_1$. When counter 26 is cocked at the conclusion of a cut, as already explained, the first current path through the coil of relay W is closed by the same action. Thereupon the normally open contacts $W_1$ and $W_2$ close, and the normally closed contacts $W_3$ open, but contacts $W_3$ do not open until after contacts $W_2$ close. Closing of contacts $W_2$ seals in relay W. Closing of contacts $W_1$ completes the current path through counter 27 and cocks this counter. When switch 25 is actuated to kick a pipe out of the machine and contactor N moves to its "on" position, the normally closed contacts $N_1$ open and break the current path through the coil of relay W. This relay drops out and its contacts return to their normal positions. Opening of contacts $W_1$ breaks the circuit through counter 27 and registers a count. Return of contacts $W_2$ and $W_3$ to their normal positions resets this portion of the circuit. Once relay W picks up and its contacts $W_3$ open, the circuit through counter 27 is independent of that through counter 26. Consequently counter 26 can operate as many times as necessary to count cuts which the machine makes without affecting operation of counter 27.

Bevelling circuit

The bevelling portion of the circuit restricts operation of the counter 26 under any operating sequence to showing actual cuts which the machine makes. Thus it assures both that bevelling operations never are registered as cuts and bevelling never prevents an actual cut from being counted. Bevelling imposes a load on motor 13 comparable with cutting, and thus the motor draws sufficient current to energize relay T. The bevelling circuit does not produce a count unless relay T had previously been energized by a current from a cutting operation.

In the usual operating sequence of bevelling after the cutting operation has been completed and the carriage 14 retracted, handle 22 and its multiple contact switch R are moved to their "on" position after handle 18 and its multiple contact switch E have been returned to their "off" position. The circuit for counter 26 has reset and relay X has dropped out. When switch R is moved to its "on" position, its normally closed contacts $R_1$ open and positively prevent energization of relay X, assuring that the relay cannot be energized at this point by closing of contacts $E_4$. If relay X does not pick up, no circuit can be completed to the counter 26. The remainder of the bevelling circuit assures that the counter circuit operates properly under the alternative sequences hereinbefore listed.

The coil of the normally energized relay V is connected across lines 30 and 31 via three possible alternative current paths, namely (a) via the normally closed contacts $V_2$ and $Z_1$, (b) via the normally closed contacts $R_3$, and (c) via the normally open contacts $T_3$. The coil of the normally energized relay Z is connected across these lines via the normally closed contacts $T_4$.

Assume that shortly after the cutting operation starts the bevelling operation also starts and that the bevelling operation is completed first (alternative case a). At the time switch R is moved to its "on" position, switch E remains in its "on" position, relay T has picked up, relays AA and Y have dropped out, relay X has picked up and sealed in, and the current paths through counter 26 and the coil of relay W have been set up by closing of contacts $X_2$ and $E_3$ and await the closing of contacts $U_1$ to cock the counter and energize the relay. When contacts $T_3$ close, they maintain relay V energized, and its normally open contacts $V_1$ thus remain open. Before contacts $T_3$ open by reason of the load on motor 13 being reduced to idling, switch R is returned to its "off" position, which both closes contacts $R_3$ to maintain relay V energized, despite subsequent opening of contacts $T_3$, and opens contacts $R_4$ to prevent completion of current paths through counter 26 and the coil of relay W except via contacts $X_2$, $E_3$ and $U_1$. Thus counter 26 is cocked and relay W energized in the usual manner on closing of contacts $U_1$, and the operation proceeds as already described.

Assume next that the sequence is as just described, except that the cutting operation is finished and the cutting tool carriage 14 is retracted before the bevelling operation is completed (alternative case b). Contactor E returns to its "off" position while relays T and U still are energized. Closing of contacts $E_1$ prevents relay U from dropping out in its usual manner and thus prevents closing of the current path via contacts $X_2$, $E_3$ and $U_1$ to cock the counter 26. The previous opening of contacts $T_4$ has deenergized relay Z and its normally closed contacts $Z_1$ have opened. Contacts $R_3$ open when switch R moves to its "on" position. Thus relay V is energized only via contacts $T_3$. Closing of contacts $R_4$ and $X_1$ sets up an alternative path for cocking the counter 26 and also energizing relay W via contacts $V_1$, $R_4$ and $X_1$. Relay T drops out at the conclusion of the bevelling operation, and opening of its contacts $T_3$ drops out relay V. Thereupon the normally open contacts $V_1$ close to cock the counter 26 and energize the relay W. When switch R returns to its "off" position on retraction of the bevelling tool 19 and its contacts $R_4$ open, the circuit to the counter is broken and the counter registers.

To reset the circuit, relay Z picks up when relay T drops out and its contacts $T_4$ close; however relay Z is slow closing and for the moment its contacts $Z_1$ remain open to assure that relay V drops out as contacts $T_3$ open. Subsequent closing of contacts $R_3$ energizes relay V, which seals in as contacts $V_2$ and $Z_1$ close. Closing of contacts $R_2$ again energizes relay AA and opens contacts $AA_1$, deenergizing relay X. Relay Y resets as before and relay U did not function.

Assume finally that the cutting operation is completed but the cutting tool carriage is not retracted at the time the bevelling operation begins (alternative case c). The counter 26 is cocked and the relay W energized in the usual manner by closing of contacts $X_2$, $E_3$ and $U_1$, but the counter does not register because contacts $E_3$ remain closed. Relay U does not reset because contacts $E_1$ remain open. When relay U dropped out, its normally open contacts $U_2$ closed and, when switch R moves to its "on" position, its contacts $R_5$ close. Closing of contacts $U_2$ and $R_5$ energizes relay AA and opens its contacts $AA_1$, whereupon relay X drops out. Contacts $X_2$ open and break the circuit through counter 26 and cause it to register. The relays reset as before on return of switches E and R to their "off" positions.

From the foregoing description it is seen that the present invention affords a virtually fool-proof circuit for operating both a counter that registers the number of times a machine operates and the total output. The count is in no way affected by auxiliary operations, and no counts can be registered by false operations of the machine. The counter circuits are especially adapted to pipe cutoff machines but are capable of generally application.

While we have shown and described only a single embodiment of the invention, it is apparent that modifications may arise. Therefore, we do not wish to be limited to the disclosure set forth but only by the scope of the appended claims.

We claim:

1. The combination with a production machine, which has the characteristic that the number of items produced thereby can be fewer than the number of complete operations thereof during the same period, of a first production counter adapted to show the number of items produced, a second production counter adapted to show the number of operations of the machine, an electric circuit connected to both of said counters and adapted to cock both at completion of an operation of the machine, means in said circuit for establishing the independence of said counters from each other after they are cocked, means in said circuit for thereafter registering the count of an operation on said second counter, said circuit being adapted to cock said second counter and register additional operations thereon after said first counter is cocked without registering on said first counter, and means in said circuit for subsequently registering production of a finished item on said first counter when cocked.

2. The combination with a production machine, which is adapted to perform both a main operation and an auxiliary operation on items produced thereby, and which has the characteristic that the number of items produced thereby can be fewer than the number of complete main operations thereof during the same period, of a first production counter adapted to show the number of items produced, a second production counter adapted to show the number of main operations of the machine, an electric circuit connected to both of said counters and adapted to cock both at completion of a main operation of the machine, means in said circuit for establishing the independence of said counters from each other after they are cocked, means in said circuit for thereafter registering the count of a main operation on said second counter, said circuit being adapted to cock said second counter and register additional main operations thereon without registering on said first counter, means in said circuit for preventing the auxiliary operation from disturbing the count on said second counter, and means in said circuit for subsequently registering production of a finished item on said first counter when cocked.

3. The combination with an electrically actuated production machine, which has the characteristic that the number of items produced thereby can be fewer than the number of complete operations thereof during the same period, of a first production counter adapted to show the number of items produced, a second production counter adapted to show the number of operations of the machine, an overload relay in the actuating circuit of the machine adjusted to pick up when the machine is performing an actual operation and to drop out when the machine is idling, an electric circuit controlled by the picking up and dropping out of said relay and connected to both of said counters and adapted to cock both at the completion of an operation of the machine, means in said second named circuit for establishing the independence of said counters from each other after they are cocked, means in said second named circuit for thereafter registering the count of an operation on said second counter, said second named circuit being adapted to cock said second counter and register additional operations thereon without registering on said first counter, and means in said second named circuit for subsequently registering production of a finished item on said first counter when cocked.

4. The combination with an electrically actuated production machine, which is adapted to perform both a main operation and an auxiliary operation on items produced thereby, and which has the characteristic that the number of items produced thereby can be fewer than the number of complete main operations thereof during the same period, of a first production counter adapted to show the number of items produced, a second production counter adapted to show the number of main operations of the machine, an overload relay in the actuating circuit of the machine adjusted to pick up when the machine is performing either a main or an auxiliary operation and to drop out when the machine is idling, an electric circuit controlled by the picking up and dropping out of said relay and connected to both of said counters and adapted to cock both at the completion of a main operation of the machine, means in said second named circuit for establishing the independence of said counters from each other after they are cocked, means in said second named circuit for thereafter registering the count of a main operation on said second counter, said second named circuit being adapted to cock said second counter and register additional main operations thereon without registering on said first counter, means in said second named circuit for preventing the auxiliary operation of the machine from disturbing the count on said second counter, and means in said second named circuit for subsequently registering production of a finished item on said first counter when cocked.

5. The combination with a pipe cutoff machine, which has the characteristic that the number of cropped pipes produced thereby can be fewer than the number of cuts made during the same period, of a first production counter adapted to show the number of cropped pipes produced, a second production counter adapted to show the number of cuts made, an electric circuit connected to both of said counters and adapted to cock both on completion of the first cut which the machine makes in a pipe, means in said circuit for establishing the independence of said counters from each other after they are cocked, means in said circuit for thereafter registering the count of a cut on said second counter, said circuit being adapted to cock said second counter and register any number of additional cuts after said first counter is cocked without registering on said first counter, and means in said circuit for subsequently registering production of a cropped pipe on said first counter when cocked.

6. The combination with an electrically actuated pipe cutoff machine, which has the characteristic that the number of cropped pipes produced thereby can be fewer than the number of cuts made during the same period, of a first production counter adapted to show the number of cropped pipes produced, a second production counter adapted to show the number of cuts made, an overload relay in the actuating circuit of the machine adjusted to pick up when the machine actually is cutting and to drop out when the machine is idling, an electric circuit controlled by the picking up and dropping out of said relay and connected to both of said counters and adapted to cock both at the completion of the first cut which the machine makes in a pipe, means in said second named circuit for establishing the independence of said counters from each other after they are cocked, means in said second named circuit for thereafter registering the count of the first cut on said second counter, said second named circuit being adapted to cock said second counter and register any number of additional cuts without registering on said first counter, and means in said second named circuit for subsequently registering production of a cropped pipe on said first counter when cocked.

7. The combination with an electrically actuated pipe cutoff machine, which has the characteristic that the number of cropped pipes produced thereby can be fewer than the number of cuts made during the same period, and which is adapted to bevel the end of a cut pipe, of a first production counter adapted to show the number of cropped pipes produced, a second production counter adapted to show the number of cuts made, an overload relay in the actuating circuit of the machine adjusted to pick up when the machine actually is cutting or bevelling and to drop out when the machine is idling, an electric circuit controlled by the picking up and dropping out of said relay and connected to both of said counters and adapted to cock both at the completion of the first cut which the machine makes in a pipe, means in said second named circuit for establishing the independence of said counters from each other after they are cocked, means in said second named circuit for thereafter registering the count of the first cut on said second counter, said second named circuit being adapted to cock said second counter and register any number of additional cuts without registering on said first counter, means in said second named circuit for preventing bevelling operations of the machine from disturbing the count on said second counter, and means in said second named circuit for subsequently registering production of a cropped pipe on said first counter when cocked.

8. The combination with a cutoff machine, which includes electrically driven means for rotating an article, a tool adapted to be advanced into a rotating article for cutting it and subsequently to be retracted, and electric control means for advancing and retracting said tool, of a counter adapted to show the number of cuts which the machine makes, an overload relay in the circuit for said electrically driven means adjusted to pick up when the machine is cutting and to drop out when the machine is idling, a contactor operated with said electric control means, and an electric circuit connected to said counter and controlled by the picking up and dropping out of said relay, said second named circuit including means for setting up a current path to said counter as said relay picks up, means for completing this current path and cocking said counter as said relay drops out, means operated by said contactor for breaking the current path through the counter and registering a count thereon as said tool is retracted, and means operated by said contactor for resetting said second named circuit.

9. The combination with a pipe cutoff machine, which includes electrically driven means for rotating a pipe, a tool adapted to be advanced into a rotating pipe for cutting it, a second tool adapted to be advanced against the end of the rotating pipe for bevelling it, and electric control means for advancing and retracting said tools, of a counter adapted to show the number of cuts which the machine makes, an overload relay in the circuit for said electrically driven means adjusted to pick up when the machine is cutting or bevelling the pipe and to drop out when the machine is idling, and an electric circuit connected to said counter and controlled by the picking up and dropping out of said relay, said second named circuit including means for setting up a current path to said counter as said relay picks up due to cutting the pipe, means for completing this current path and cocking the counter as said relay drops out, means for registering a count thereon as said cutting tool is retracted, and means for preventing the bevelling of the pipe from disturbing the count.

10. The combination with a production machine which has the characteristic that the number of items produced thereby can be fewer than the number of complete operations thereof during the same period, of a production counter for the number of items produced, a production counter for the number of operations of the machine, an electric circuit connected to both said counters, means for conditioning current paths in said circuit to both said counters at the start of the first operation of the machine on each item, means for completing the current paths to both said counters at the conclusion of the first operation and thereby cocking both counters, means for breaking the current path to said second counter after it is cocked and thereby registering an operation of said machine, means for establishing the independence of the circuits to the respective counters from each other after they are cocked to allow said second counter to operate any number of times independently of said first counter to register additional operations of said machine, and means for breaking the current path to said first counter for subsequently registering the production of a finished item.

11. A combination as defined in claim 10 in which the means for conditioning current paths to the counters includes a load relay in the operating circuit to said machine, said relay picking up when the machine is performing an operation, but otherwise dropping out.

12. A combination as defined in claim 10 in which said machine is adapted to perform an auxiliary operation tending to condition current paths to said counters, and including means for preventing said auxiliary operation from registering on said counters.

References Cited in the file of this patent

UNITED STATES PATENTS

| | | |
|---|---|---|
| 2,048,192 | Marston | July 21, 1936 |
| 2,056,689 | Reher | Oct. 6, 1936 |
| 2,256,222 | Smith | Sept. 16, 1941 |
| 2,425,124 | Ray | Aug. 5, 1947 |
| 2,427,127 | Dysart | Sept. 9, 1947 |
| 2,447,588 | McNairn | Aug. 24, 1948 |
| 2,469,655 | Leathers | May 10, 1949 |